United States Patent [19]

Scheuneman

[11] Patent Number: 4,649,475
[45] Date of Patent: Mar. 10, 1987

[54] MULTIPLE PORT MEMORY WITH PORT DECODE ERROR DETECTOR

[75] Inventor: James H. Scheuneman, St. Paul, Minn.

[73] Assignee: Sperry Corporation, New York, N.Y.

[21] Appl. No.: 596,132

[22] Filed: Apr. 2, 1984

[51] Int. Cl.[4] .................... G06F 13/00; G06F 11/00
[52] U.S. Cl. ..................................... 364/200; 371/51
[58] Field of Search ........................................ 371/51;
364/200 MS File, 900 MS File; 365/189

[56] References Cited

U.S. PATENT DOCUMENTS

| | | | |
|---|---|---|---|
| 3,784,978 | 1/1974 | Zola | 371/52 X |
| 4,016,541 | 4/1977 | Delagi et al. | 364/200 |
| 4,028,668 | 6/1977 | Riikonen | 364/200 |
| 4,028,675 | 6/1977 | Frankenberg | 364/900 |
| 4,084,236 | 4/1978 | Chelberg et al. | 364/200 |
| 4,349,870 | 9/1982 | Shaw et al. | 364/200 |
| 4,415,972 | 11/1983 | Adcock | 364/200 |
| 4,443,846 | 4/1984 | Adcock | 364/200 |
| 4,455,602 | 6/1984 | Baxter, III et al. | 364/200 |
| 4,493,036 | 1/1985 | Boudreau et al. | 364/200 |
| 4,509,115 | 4/1985 | Manton et al. | 364/200 |
| 4,509,140 | 4/1985 | Cheung | 364/900 |
| 4,535,420 | 8/1985 | Fung | 364/900 |
| 4,577,292 | 3/1986 | Bernstein | 364/900 |

Primary Examiner—Archie E. Williams, Jr.
Assistant Examiner—William G. Niessen
Attorney, Agent, or Firm—Charles A. Johnson; Lawrence J. Marhoefer

[57] ABSTRACT

An improved multiple port memory system has a priority network for selecting between multiple units seeking access thereto. The priority network responds to requests for access and provides encoded port identifying signals indicative of the port to have access. Decode circuitry decodes the encoded port identifying signals and provides unique port enabling signals for the selected port. Decode error detection circuitry responds to the decoded port enabling signals and provides a decode error indication any time multiple port enabling signals are detected as occurring simultaneously. Port Code error detecting circuitry respond to the encoded port identifying signals and the decoded port enabling signals to provide a code error indicating signal when a port code error condition is detected.

14 Claims, 20 Drawing Figures

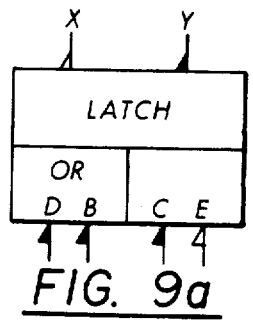
FIG. 9a
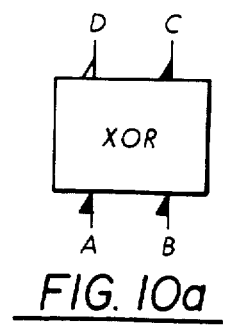
FIG. 10a
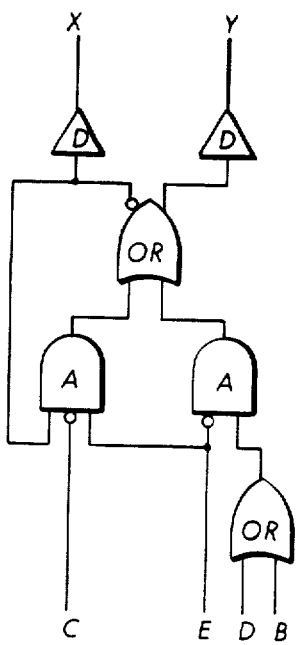
FIG. 9c
FIG. 9b
FIG. 10b
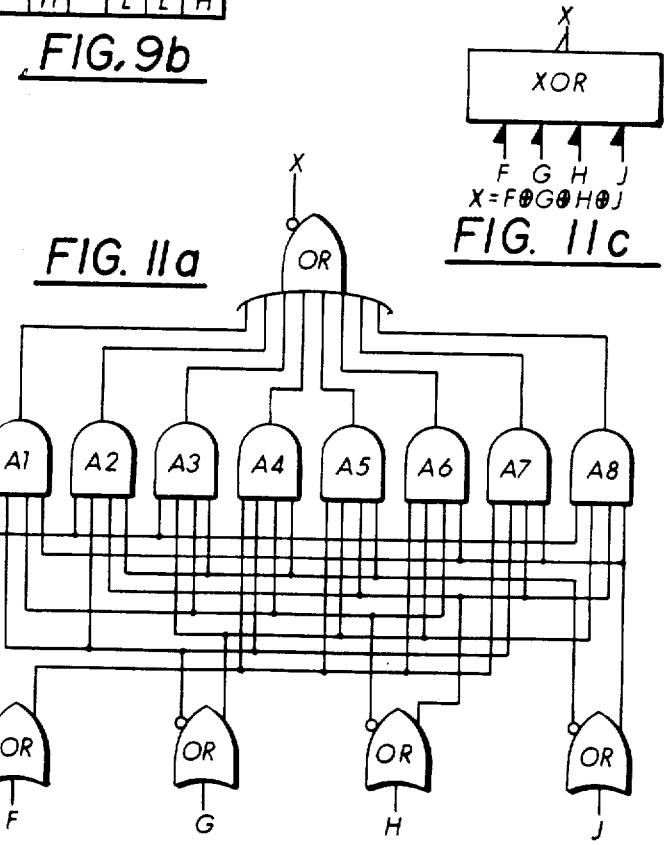
FIG. 11a
FIG. 11c
FIG. 11b

MULTIPLE PORT MEMORY WITH PORT DECODE ERROR DETECTOR

RELATED PATENT APPLICATIONS

The following co-pending patent applications are assigned to the assignee of this invention, and their teachings are incorporated herein by reference:

Title: READ ERROR THROUGH-CHECKING SYSTEM
Inventor: James H. Scheuneman
Ser. No.: 354,340
Filed: Mar. 2, 1982; now abandoned.

Title: READ ERROR OCCURRENCE DETECTOR FOR ERROR CHECKING AND CORRECTING SYSTEMS
Inventors: Gary D. Burns and Scott D. Schaber
U.S. Pat. No. 4,523,314
Filed: Feb. 1, 1983

Title: HIGH PERFORMANCE STORAGE UNIT
Inventor: James H. Scheuneman
Ser. No.: 596,130
Filed: Apr. 2, 1984

Title: MULTIPLE UNIT ADAPTER
Inventor: James H. Scheuneman
Serial No.: 596,205
Filed: Apr. 2, 1984

Title: A PRIORITY REQUESTER ACCELERATOR
Inventors: John R. Trost and Daniel Zenk
Ser. No.: 530,285
Filed: Aug. 31, 1983

BACKGROUND OF THE INVENTION

A. Field of the Invention

This invention relates to the field of digital data processing systems wherein one or more host data processors utilize one or more supporting scientific processors in conjunction with storage systems that are commonly accessible. More particularly it relates to an improved High Performance Storage Unit for use in such a digital data processing system. Still more particularly this invention relates to an improved multiple port memory system having port decode error detecting circuitry. Still more particularly, the invention relates to a multiple port memory system operable in a pipeline mode and having error detection circuitry for signaling the occurrence of decoding errors as they are detected.

B. State of the Prior Art

Digital data processing systems are known wherein one or more independently operable data processors function with one or more commonly accessible main storage systems. Systems are also known that utilize a support processor with its associated dedicated supporting, or secondary storage system. Such support processors are often configured to perform specialized scientific computations and are commonly under task assignment control of one of the independently operable data processors. The controlling data processor is commonly referred to as a "host processor". The host processor characteristically functions to cause a task to be assigned to the support processor, to cause required instructions and data to be transferred to the secondary storage system; to cause the task execution to be initiated; and to respond to signals indicating the task has been completed, so that results can be transferred to the selected main storage systems. It is also the duty of the host processor to recognize and accommodate conflicts in usage and timing that might be detected to exist. Commonly, the host processor is free to perform other data processing matters while the support processor is performing its assigned tasks. It is also common for the host processor to respond to intermediate needs of the support processor, such as providing additional data if required, responding to detected fault conditions and the like.

In the past, support scientific data processors have been associated with host data processing systems. One such prior art scientific processor is disclosed in U.S. Pat. No. 4,101,960, entitled "Scientific Processor" and assigned to Burroughs Corporation, of Detroit, Mich. In that system, a single instruction multiple data processor, which is particularly suited for scientific applications, includes a high level language programmable front-end processor; a parallel task processor with an array memory; a large high speed secondary storage system having a multiplicity of high speed input/output channels commonly coupled to the front-end processor and to the array memory; and an over-all control unit. In operation of that system, an entire task is transferred from the front-end processor to the secondary storage system whereupon the task is thereafter executed on the parallel task processor under the supervision of the control unit, thereby freeing the front-end processor to perform general purpose input/output operations and other tasks. Upon parallel task completion, the complete results are transferred back to the front-end processor from the secondary storage system.

It is believed readily seen that the front-end processor used in this earlier system is a large general purpose data processing system which has its own primary storage system. It is from this primary storage system that the entire task is transferred to the secondary storage system. Further, it is believed to be apparent that an input/output path exists to and from the secondary storage system from this front-end processor. Since task transfers involve the use of the input/output path of the front-end processor, it is this input/output path and the transfer of data thereon between the primary and secondary storage systems which becomes the limiting link between the systems. Such a limitation is not unique to the Scientific Processor as disclosed in U.S. Pat. No. 4,101,960. Rather, this input/output path and the transfers of data are generally considered to be the bottleneck in many such earlier known systems.

The present scientific data processing system is considered to overcome the data transfer bottleneck by providing an unique system architecture using a high speed memory unit which is commonly accessible by the host processor and the scientific processor. Further, when multiple high speed storage units are required, a multiple unit adapter is coupled between a plurality of high speed memory units and the scientific processor.

Data processing systems are becoming more and more complex. With the advent of integrated circuit fabrication technology, the cost per gate of logic elements is greatly reduced and the number of gates utilized is ever-increasing. A primary goal in architectural design is to improve the through-put of problem solutions. Such architectures often utilize a plurality of processing units in cooperation with one or more multiple port memory systems, whereby portions of the same problem solution may be parcelled out to different processors or different problems may be in the process of solution simultaneously.

Another primary goal in the development of data processing systems is to provide ever-increasing assurance of the integrity of the data being manipulated. Early data processing systems were designed to provide indication, for example by interrupt, of detected data errors. The use of parity bits on data words or data characters is will known. It was and still is a primary means of establishing that an error condition exists in an associated data word or character. Normally, upon detection of a parity error, the erroneous data word was inhibited from further use in the data processing run stream, and an indication of parity fault was provided so that maintenance could be performed on the system. It is, of course, apparent that multiple errors can be offsetting, and thereby defeat the parity checking circuitry. Such offsetting errors may allow erroneous data to be processed.

It has long been recognized to be advantageous in the transmission of binary digital signals to encode these signals in an error detecting/correcting code format that allows the detection of errors at the receiving end. The detection of errors is coupled with the correction of predetermined numbers of errors when decoded. This type of transmission pays the price of transmitting more bits than incorporated in the data bits, but gains the advantage of assuring that the received data is accurate or is to some degree correctable. Such a technique was proposed for coding data permitting correction of single bit errors and detection of double bit errors, by R. W. Hamming in an article, entitled "Error Detecting and Error Correcting Codes" in the Bell System Technical Journal, Volume 29, Pages 147 through 160, published April, 1950. This type of approach found early adaptation in data communications, and more recently has been applied to memory systems. Considerable effort has been devoted to such fault tolerant memory systems, relating to detecting and correcting various combinations of error conditions, all incorporating the use of Error Correction Codes (ECC). For example, ECC systems are described in U.S. Pat. No. 3,755,770 to Donald Walter Price; U.S. Pat. No. 4,345,328 to Gary D. White; U.S. Pat. No. 4,077,028 to Albert S. Lui and Majid Arbab; U.S. Pat. No. 4,319,356 to James E. Kocol and D. B. Schuck; U.S. Pat. No. 4,077,565 to Chester M. Nibby, Jr. and George J. Barlow; and U.S. Pat. No. 4,319,357 to Douglas C. Bossen.

The foregoing identified patents describe various types of systems that can code data bits with redundant check bits in various configurations, with check bits being recorded in the memory system with the data bits. When the data bits are to be accessed, systems are described for reconstituting check bits from the data bits read, and thereafter performing comparison to the check bits that were originally recorded. Syndrome bits are generated as a result of comparison of the reconstituted check bits to the check bits ready from memory. The syndrome bits are decoded and a determination made as to which, if any, error bits are detected, and which error bit(s) can be corrected. Various types of circuitry are described for effecting the corrections that can be accomodated in the system. It is noted, that the ECC systems and the parity systems all relate to evaluation of the data and associated control signals. Clearly these are important functions and provide assurance of data integrity.

In addition to the error detection and correction functions it has developed that through-checking is desirable for detecting and isolating errors that occur as data is transferred through the system. Through-checking ECC systems for use with memory devices are described in the identified co-pending applications entitled "MEMORY THROUGH-CHECKING SYSTEM", and "READ ERROR OCCURRENCE DETECTOR FOR ERROR CHECKING AND CORRECTING SYSTEM". Systems of this type relate to the accuracy of generation of the ECC signals, and the accuracy of operation of the circuitry, as distinguished from the accuracy of the data as manipulated.

In systems that utilize a multiplicity of processors to access, a common memory system, either for reading or writing, it has been found necessary to establish an access priority sequence between processors seeking access to the memory system. Memory systems that can accommodate multiple requestors, such as multiple processing units, are designated multiple port or multiple channel memory systems. In such systems, it is necessary to identify the processor seeking access to the memory system, and to enable the appropriate port or channel associated with the identified requestor. With multiple requestors, it is common to have requests queued up and to have memory addressing and data to be written available from the queued sources. In the event of a decoding error, that is an error in identifying the proper requestor, an entirely erroneous selection of addressing and data to be written can occur. Even assuming that parity is associated with the data words, or an ECC system is incorporated, such decoding errors will often go undetected because the word or words processed in the run stream will be proper and correct, but will be associated with the erroneously identified requestor. Since the requests are queued, the memory system is essentially pipelined and is conditioned to handle requests in a predetermined manner. Further, through timing control, the operation of the selection and memory system is overlapped. This means that certain functions related with one requestor are being completed while other functions of the next subsequent requestor are being initiated. It is clear that errors in decoding, that is erroneous identification of requestors, results in system malfunction that is difficult to isolate and identify if not detected close in time to the occurrence of the error condition.

OBJECTS

It is a primary object of this invention to provide an improved digital data processing system wherein one or more host data processors utilize one or more supporting scientific processors in conjunction with storage systems that are commonly accessible.

Another primary object of the invention is to provide an improved High Performance Storage Unit for use in a data processing system.

It is a primary object of the invention to provide an improved multiple port memory system having port selection error checking circuitry.

Another object of the invention is to provide an improved high performance multiple port memory system having port selection through checking.

Yet another object of the invention is to provide a multiple port memory system having port decode error checking circuitry for providing an error indication when more than one port is selected for accessing.

A further object of the invention is to provide an improved multiple port memory system having port code error checking circuitry for providing an error indication when the port code is determined to be incorrect.

Still another object of the invention is to provide an improved multiple port memory system having a port decoding and port code through-checking circuitry that imposes minimal time overhead in gaining access to the memory system.

Yet another object of the invention is to provide port selection error checking for use in a multiple port memory system that is economical to implement and operate.

The foregoing objectives and other more detailed and specific objects will become apparent and be understood from the drawings and the description of the invention.

SUMMARY OF THE INVENTION

The digital data processing system includes one or more host processors each coupled to one or more high performance storage units. Host processors can be selected from units available commercially, where the 1100/90 System available from Sperry Corporation is found to be particularly advantageous.

The High Performance Storage Unit (HPSU) is unique, and is basically a memory unit capable of coupling to various pluralities of instruction processors, and input/output units as well as to a pair of Scientific Processors (SP). Since each HPSU is directly connected to the input/output units and the instruction processors of the host system, it is an inherent part of the host data processing system. On the other hand, since it is also directly connected to the Scientific Processor, it is also its main storage system. Because of its novel properties, it is able to interface both with the host system and the Scientific Processor without the resulting "bottleneck" of past scientific data processing systems.

When more than one HPSU is desired to provide additional storage capacity, a Multiple Unit Adapter (MUA) is utilized between each Scientific Processor and multiple High Performance Storage Units. Generally, the MUA is an interface unit which couples a single Scientific Processor through the use of a single Scientific Processor port to a plurality of up to four HPSUs via four HPSU ports. In this manner a Scientific Processors may address, read and write any location in any of the HPSUs.

The MUA is used in a scientific data processing system to interface at least one Scientific Processor to a plurality of High Performance Storage Units. The use of a separate MUA in such a data processing system enables the Scientific Processor of such a system to have a single HPSU port to thereby reduce the cost of the Scientific Processor when a single HPSU is desired to be used in the system. This MUA is required only when more than one HPSU is used in the scientific data processing system, thereby providing the additional memory interfaces needed for the Scientific Processor.

The Scientific Processor (SP) used herein is a special purpose processor attached to the host system via the HPSU(s). It is optimized for high speed execution of floating-point vector arithmetic operations. The SP provides increased performance for both integer and floating-point scalar operations that are embedded in the vectorized code to thereby provide overall increased performance for scientific vector FORTRAN programs.

The invention includes a high performance multiple port memory system having a priority network for selecting among a plurality of requesting units. The priority network provides encoded port identifying signals. The encoded signals identify uniquely which of the requesting units is to be given access to the memory system. The multiple requesting units are coupled to a plurality of multiplexers for function selection, addressing, and data transfer. The encoded signals when properly decoded, function to control the plurality of multiplexers to accomplish selection for the appropriate requesting unit. Decoding through-checking circuits are responsively coupled to the encoded signals, and provide decode error indicating signals whenever it is determined that more than one unique multiplexer enable signal is present. The decode error indicating signal can be utilized to inhibit further access to the multiple port memory system, and can be used in maintenance for indicating the decoding circuitry that is malfunctioning. Code error detecting circuitry is responsively coupled to the encoded signals and the decoded multiplexer enable signals (the port selection enable signals,) and provides a code error indicating signal when it is detected that the port enable signal generated does not coincide with the encoded port identifying signals. The code error indicating signals can also be used for inhibiting further access to the multiple memory system, and can be utilized in maintenance for identifying malfunctioning circuitry.

BRIEF DESCRIPTION OF THE DRAWINGS

FIG. 9a is a logic block diagram symbol for a Latch, that will provide true output Y and complement output X;

FIG. 9b is a Truth Table for the functioning of the Latch illustrated in FIG. 9a;

FIG. 9c is a logic element drawing of the Latch illustrated in FIG. 9a, and illustrates the logical elements and interconnections to accomplish the Latch function;

FIG. 10a is the logic block diagram symbol for the two-input Exclusive-OR (XOR);

FIG. 10b is the Truth Table for the Exclusive-OR illustrated in FIG. 10a;

FIG. 11a is a logic element drawing of a four-input Exclusive-OR (XOR);

FIG. 11b is a Truth Table illustrating the signal relationships of the Exclusive-OR circuit FIG. 11a;

FIG. 11c is the logic block diagram symbol for the four input Exclusive-OR (XOR) circuit of FIG. 11a;

DETAILED DESCRIPTION OF THE PREFERRED EMBODIMENT

A. Conventions

Figure 1:
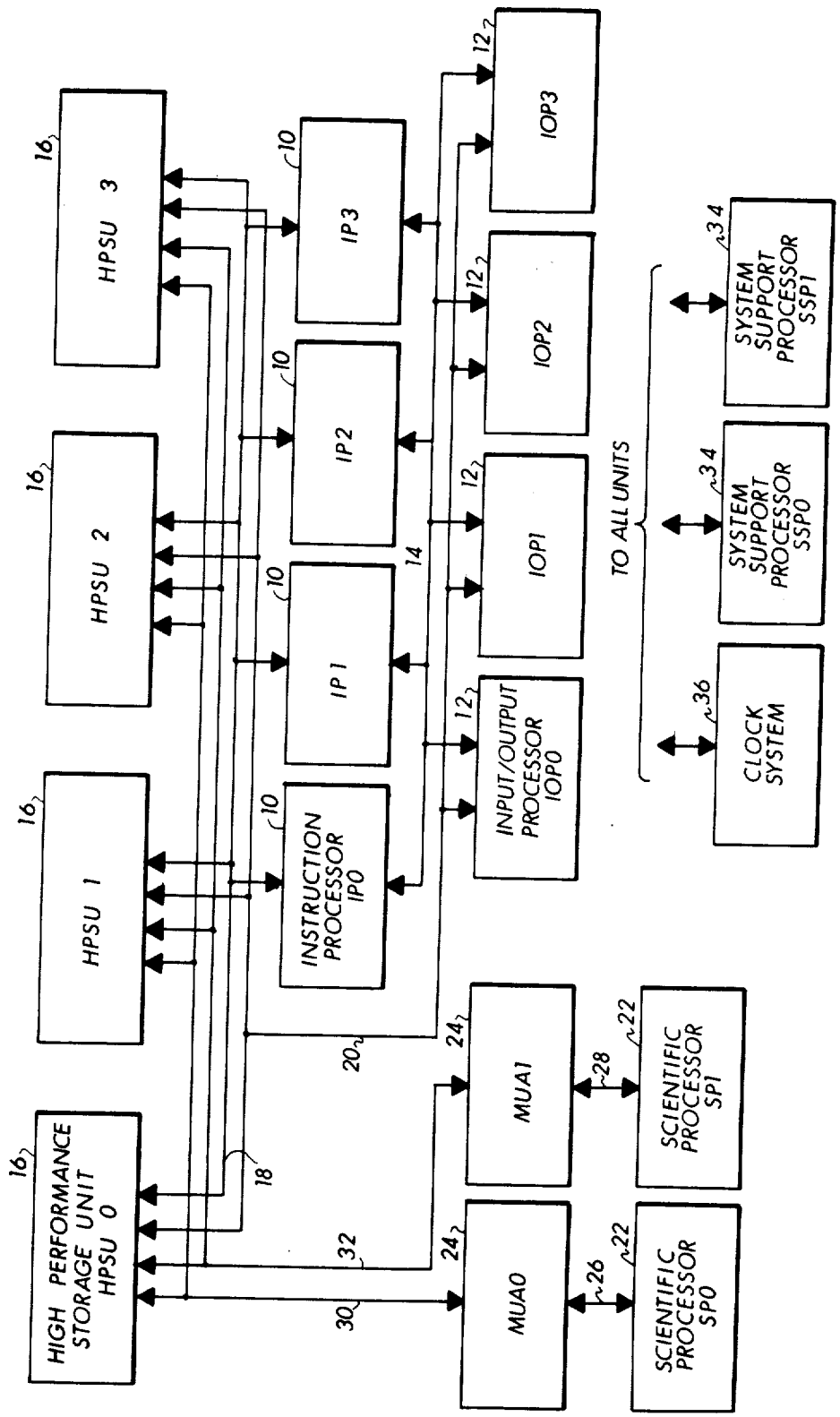
FIG. 1 is a system block diagram of the over-all digital data processing system in which the invention can be utilized.

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor, a group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is convenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will indicate that the AND function is on High signals and will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of an High OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead inputs will provide a Low output signal at the open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking the right-most half-arrowhead in the symbolic representation will be considered as the true output and will define the function of the element, and the left-most half-arrowhead will be considered as the complement thereof. For example, an A symbol having two or more closed half-arrowhead inputs and a right-most closed half-arrowhead would normally indicate an AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various types of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function; and the symbol having a curve at the input and the curve pointed output, often referred to as the "shield" symbol, represents circuits that perform the logical OR function. For the AND function the straight line input or the dot, represents a High AND, and results in a High output signal when all input signals are High. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

B. The System

FIG. 1 is a system block diagram of the over-all digital data processing system in which the invention can be utilized. The over-all system is essentially modular, and provides for parallel processing.

For the configuration illustrated, from one to four Instruction Processors IP0 through IP3, each labelled 10, can be utilized. Each IP can for example be a Type 3054-00 unit available from Sperry Corporation, or such other Instruction Processor available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input/Output Processors IOP0 through IOP3, labelled 12, can be utilized. The interconnections between the IPs and the IOPs, collectively labelled 14, are in fact direct connections between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the sys-Central Processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above identified copending incorporated patent applications.

Error Correction Code (ECC) is used internal to each HPSU to provide single-bit error correction and double-bit error detection.

In the embodiment illustrated one or two Scientific Processors SP0 and SP1, labelled 22, can be utilized. If a signle SP is used with a single HPSU, it may be coupled directly to the SP port of such HPSU. When two or more HPSUs are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through interconnection path 32.

Each SP functions under direction of one or more of the IPs to perform scientific type calculations in a support mode. In this regard, the IPs can be considered to be host processors and the SPs can be considered to be support processors, all operating through common storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and setting of information, the activation of most maintenance facilities, selecting modes of operation and the like, is done at the control section of the SSP.

A Clock System 36 is utilized to maintain synchronous operation of the entire system. Clock and synchronizing signals are sent to each IP as will as each HPSU, each IOP, and each SP. The clock interface includes signals and commands from the IP for controlling clock rates, clock mode, cycle count, and other capabilities of the clock. The clock system is novel, and is described in one of the above identified copending patent applications.

Intercommunication between units is essentially on a Request and Acknowledge basis, and the interfaces will be described in more detail as appropriate.

C. High Performance Storage Unit (HPSU)

Figure 2:
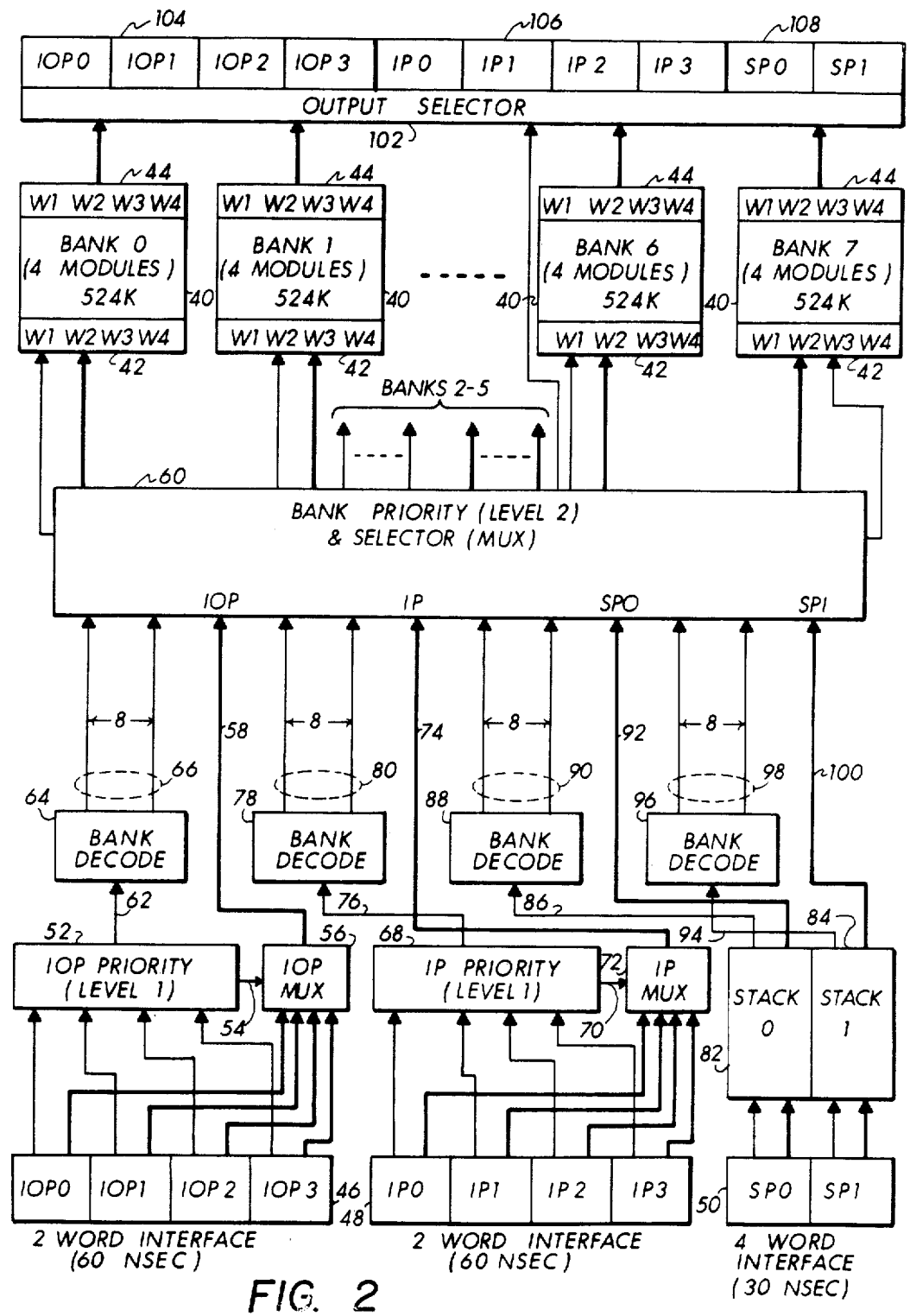
FIG. 2 is a simplified functional block diagram of the High Performance Storage Unit.

FIG. 2 is a simplified functional blocked diagram of the High Performance Storage Unit.

The HPSU is a storage device that is commonly accessable by the IPs, the IOPs, and the SPs via the MUAs. The various devices that can be coupled to the HPSU can have differing interface systems and operational rates.

In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524 K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the single lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IP0 through IP3. The IOP ports 46 and the IP ports 48 each operate on a two-word interface at a clock rate of 60 nanoseconds.

The HPSU also has an input SP interface 50 which can accommodate two SPs at the two ports labelled SP0 and SP1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 awaiting availability of the memory system. In essence, Stack 0 and Stack 1 are each a first-in first-out (FIFO) circulating buffer. The request information feeds out of Stack 0 on line 86 to the Back Decode 88 which provides a one-of eight selction and data passes on line 92 to the Bank Priority Selector 60. Similarly, request information passes on line 94 to the Bank Decode 96 for making selctions on lines 98, while the data passes on line 100.

The Bank Priority and Selector functions to select between the IOP, IP, and the two SP requests presented to it for accessing memory. It also functions to control the Output Selector 102 when reading is to take place.

The HPSU has an IOP output 104 capable of handling four IOP ports IOP0 through IOP3. It also has an IP output 106 capable of handling four IP ports labelled IP1 through IP3. Finally, it has an SP output 108 capable of handling two SP output ports labelled SP0 and SP1. Data rates and timing at the output ports 104, 106 and 108 are similar to those for the input ports previously described.

D. Multiple Adapter (MUA)

Figure 3:
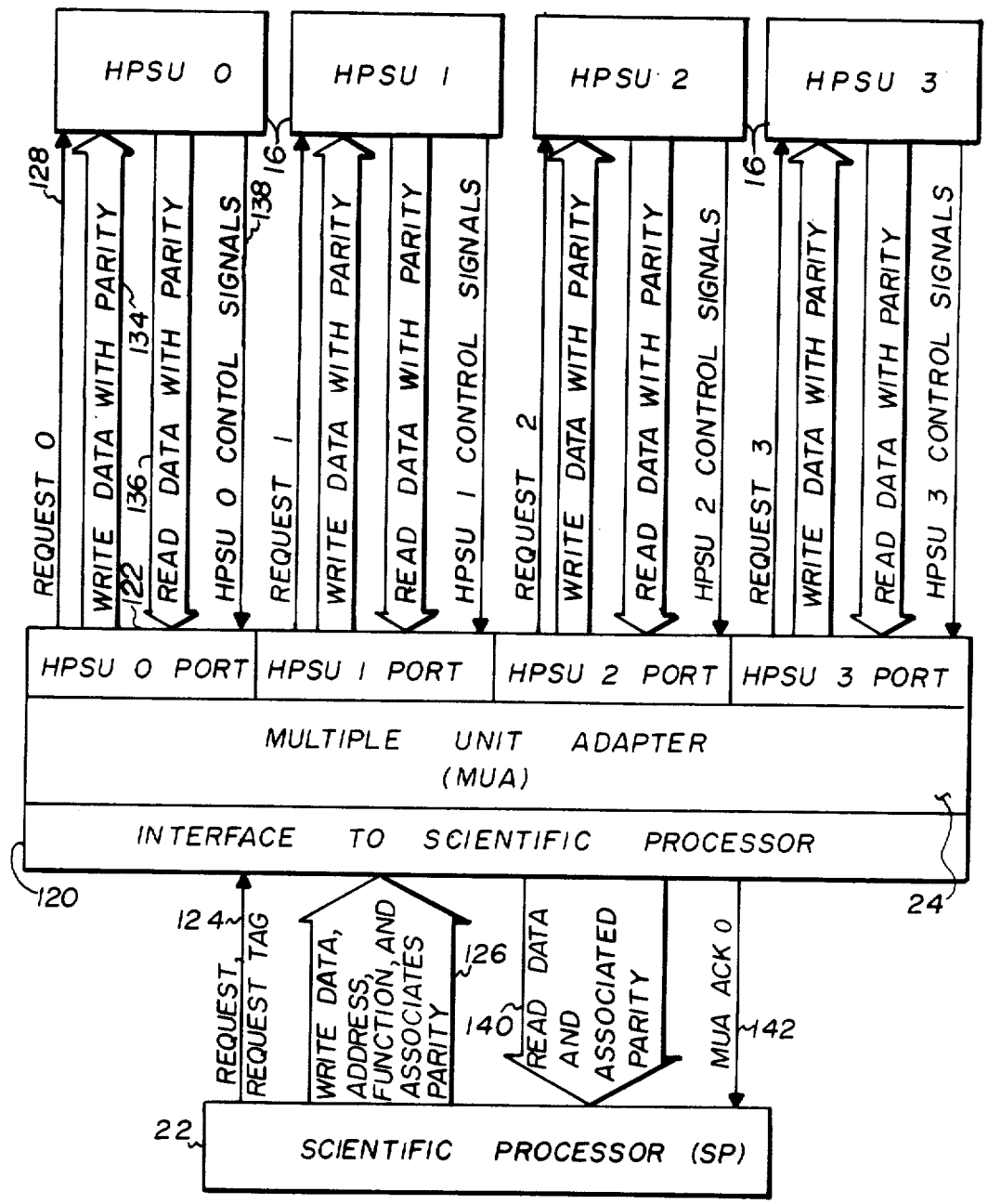
FIG. 3 is a simplified block diagram of the Multiple Unit Adapter (MUA) for providing selective interconnection of a Scientific Processor to one of up to four High Performance Storage Units.

FIG. 3 is a simplified block diagram of the Multiple Unit Adapter (MUA) for providing selective interconnection of a Scientific Processor to one of up to four High Performance Storage Units.

The MUA 24 has an Interface to Scientific Processor 120 and up to four HPSU ports 122, each adapted for interconnection to an associated HPSU 16.

A Scientific Processor (SP) issues Request signals on control path 124 to the MUA. For a write operation, the write data, address, function, and associated parity is provided via cable 126. The MUA can accumulate up to eight requests from the SP without acknowledgement, and the requests and the associated data are stored in a first-in first-out (FIFO) stack (not shown).

For purposes of example, if it is assumed that the SP has designated HPSU0, and the request is determined by the MUA to be the next request to be processed, a Request 0 will be provided on control path 128 to HPSU0. Recalling that this will be only one of several requests that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPSU0 control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) signal will be passed on control path 142 to the SP, thereby indicating that the stack has room for one more request.

When the MUA has passed eight requests to an HPSU withoutacknowledgement the MUA ceases requesting until an Acknowledge 1 (ACK 1) control signal is received in control cable 138.

The control and data path lines for HPSU1, HPSU2, and HPSU3, would function in a similar manner. When the SP requests access to a different HPSU, all outstanding requests to the first HPSU must be serviced prior to the MUA processing requests to a different HPSU.

All data and control signals from the SP are passed on to the HPSU, and all data and control signals from the HPSU are passed on to the SP with the exception of a few special control signals. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

E. Scientific Processor (SP)

Figure 4:
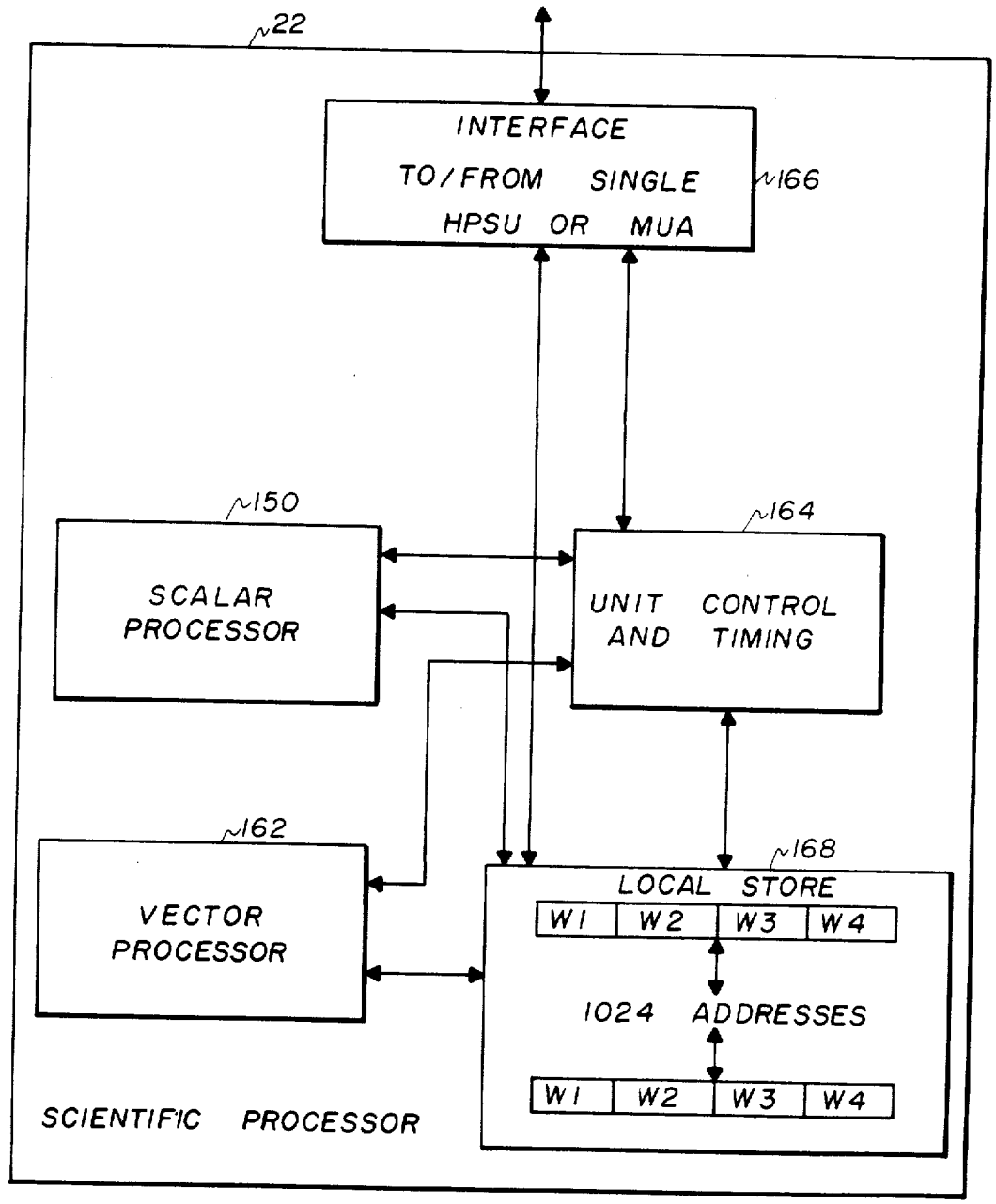
FIG. 4 is a simplified block diagram of the Scientific Processor.

FIG. 4 is a simplified block diagram of the Scientific Processor.

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any privileged modes of operation. The SP includes distinct modules, the Scalar Processor 150, the Vector Processor 162, the Unit Control Timing 164, the Interface 166, and the Local Store 168.

The Vector Processor module 162 performs vector calculations. The Scalar Processor module 150 performs scalar operations, and also has the over-all control function, including instruction fetch and issue. Generally speaking, the Scalar and Vector processor modules operate in parallel although some Scientific Processor instructions require both modules to execute.

The Local Store 168 in the preferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted is distinguish from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

F. Port Decode Error Detector System

The invention has particular application to the HPSU, and in general provides through-checking of the decoding of the port selection. In the following descriptions, the frame of reference will be the HPSU, it being understood that each unit coupled to the HPSU, whether it be IOP, IP, or SP, will be designated as a "Requester", thereby indicating a Request for access to the memory.

The following listing identifies the named signals according to the number of conductors relative to each type of Requester unit. It will be understood that other signal lines may be used for other types of control functions, but are not defined or discussed since they do not add to an understanding of the subject invention.

| HPSU/REQUESTER INTERFACE SIGNALS | | | | |
|---|---|---|---|---|
| | NUMBER OF LINES | | | DIRECTION |
| SIGNAL | IOP | IP | SP | REQUESTER |
| REQUESTER AVAILABLE | 2 | 2 | 2 | To HPSU |
| HPSU AVAILABLE | 2 | 2 | 2 | From HPSU |
| REQUEST | 1 | 1 | 1 | To HPSU |
| ACKNOWLEDGE 1 | 1 | 1 | 1 | From HPSU |
| ADDRESS | 24 | 24 | 22 | To HPSU |
| ADDRESS PARITY | 4 | 4 | 3 | To HPSU |
| WRITE DATA | 72 | 72 | 144 | To HPSU |
| WRITE DATA PARITY | 8 | 8 | 16 | To HPSU |
| READ DATA | 72 | 72 | 144 | From HPSU |
| READ DATA PARITY | 8 | 8 | 16 | From HPSU |

| -continued | | | | |
|---|---|---|---|---|
| HPSU/REQUESTER INTERFACE SIGNALS | | | | |
| | NUMBER OF LINES | | | DIRECTION |
| SIGNAL | IOP | IP | SP | REQUESTER |
| FUNCTION CODE | 5 | 5 | 6 | To HPSU |
| FUNCTION CODE PARITY | 1 | 1 | 1 | To HPSU |
| START | 6 | 6 | 0 | To HPSU |
| START PARITY | 1 | 1 | 0 | To HPSU |
| END | 6 | 6 | 0 | To HPSU |
| END PARITY | 1 | 1 | 0 | To HPSU |

In the following discussion of the drawings certain abbrevations will be utilized. In this regard, Request is REQ, Address is ADRS, Function is FUNC, Multiplexer is MUX, Enable is EN, Register is REG, Error is ERR, Execlusive-OR is XOR, and an AND function is A.

Figure 5:
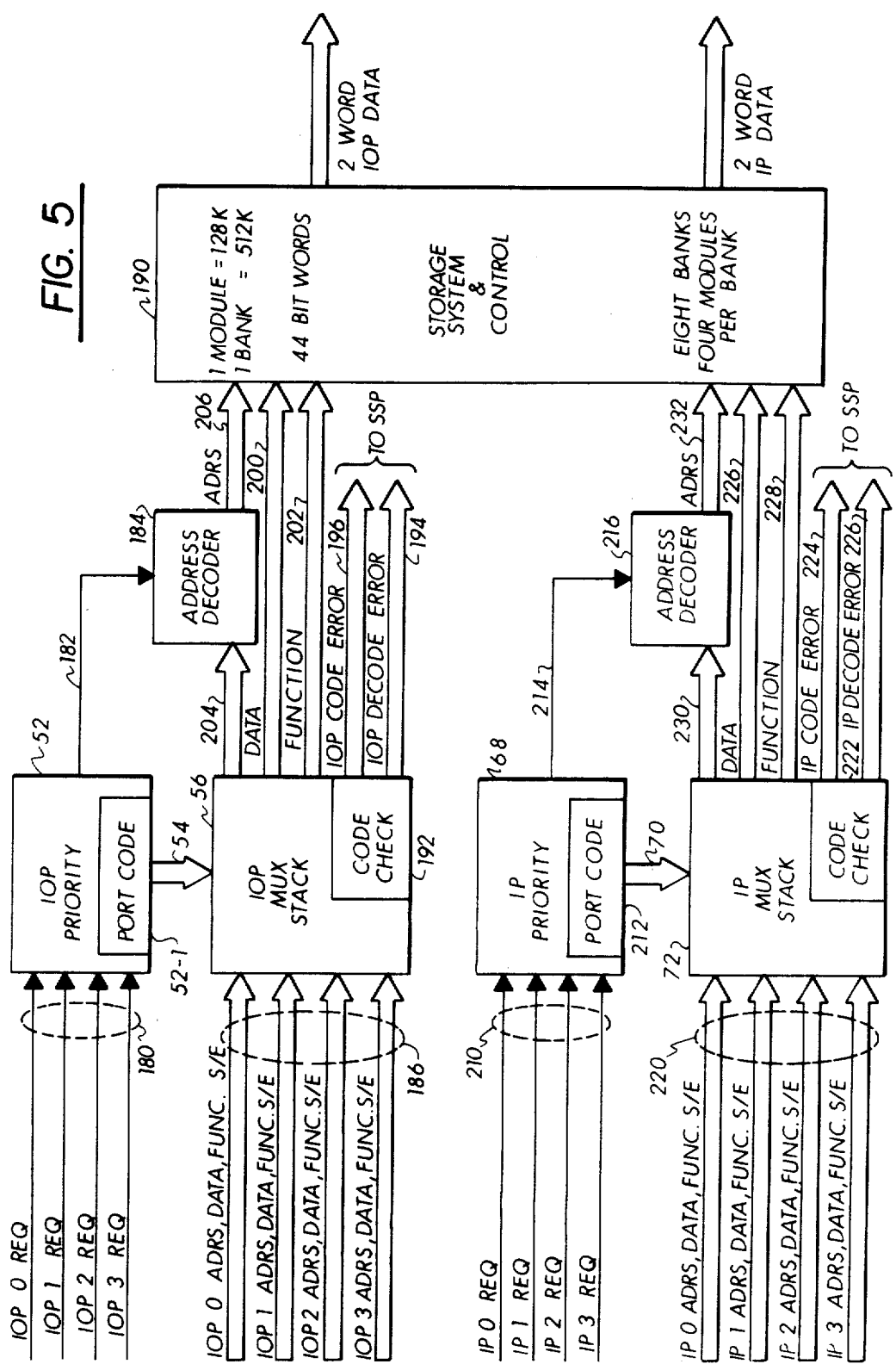
FIG. 5 is a block diagram of the port decode error detector for data multiplexers utilized in the High Performance Storage Unit.

FIG. 5 is block diagram of the port decode error detector for data multiplexers utilized in the High Performance Storage Unit. The four IOP Requests are applied via lines 180 to the IOP Priority 52, which functions through its Port Code circuitry 52-1 to convert the selected one-of-four Request lines into a two-bit Port Code to be issued on line 54. The Priority circuitry 52 can be of a snapshot type described in one of the above identified copending patent applications. The IOP Priority 52 also provides signals on path 182 to the Address Decoder 184.

The IOP Address, Data, Function and S/E signals are applied for the four IOP terminals via cables 186 to the IOP MUX Stack 56. The Port Code provided on line 54 functions through the IOP MUX Stack to select the indicated one-of-four IOP ports to be given access to the Storage System and Control 190. As a part of the port selection, the IOP MUX Stack 56 performs a code check through the Code Check circuitry 192 as the Port Code is decoded for actuation of the particular IOP MUX in the IOP MUX Stack 56. If the decoded Port Code is detected to be in error, that is more then one of the ports are selected, an IOP Decode Error signal will be provided on line 194 to the System Support Processor (SSP) for ultimate recording and error analysis. The Code Check circuitry 192 is also capable of comparing the IOP MUX enable signals derived from the Port Code against the basic Port Code for determining whether or not an error in the Port Code has occurred. In the event such a Code Error is detected, an IOP Code Error signal will be provided on line 196 to the SSP. If both the decode and code error checks are satisfied, the selected Data is provided in line 200, the selected Function is provided on line 202, and the Address is provided on line 204. The address Decoder 184 determines the address to be provided on line 206 to the Storage System and Control 190. It is of course understood that if the Function is a Read, no data will be provided on line 200, but instead, the Address will specify the addressable locations in the Storage System and Control 190 from which reading will take place.

The IP port selection is accomplished in essentially the same manner as that described for the IOP ports. The IP Requests are provided on lines 210 to the IP Priority 68, and through its Port Code circuitry 212 causes a 2-bit Port Code to be issued on line 70 to the IP MUX Stack 72. It also provides signals on line 214 to the Address Decoder 6. The Address, Data, Function, and S/E control signals are applied on lines 220 for the four IP ports. In a manner similar to that described above, the IP Port Code provided on line 70 is subjected to the Code Check circuitry 222 and if found in error, results in an IP Code Error signal on line 224. If the decoding of the IP Port Code is found to be in error, an IP Decode Error signal is provided on line 226 to the SSP. For correctly enabled MUX stack selections, that is when no Code Error or Decode Error occur, the data will be provided for a write operation on lines 226, the Function will be provided on line 228, and the Address will be provided on line 230. The decoded Address will be provided on line 232.

Figure 6:
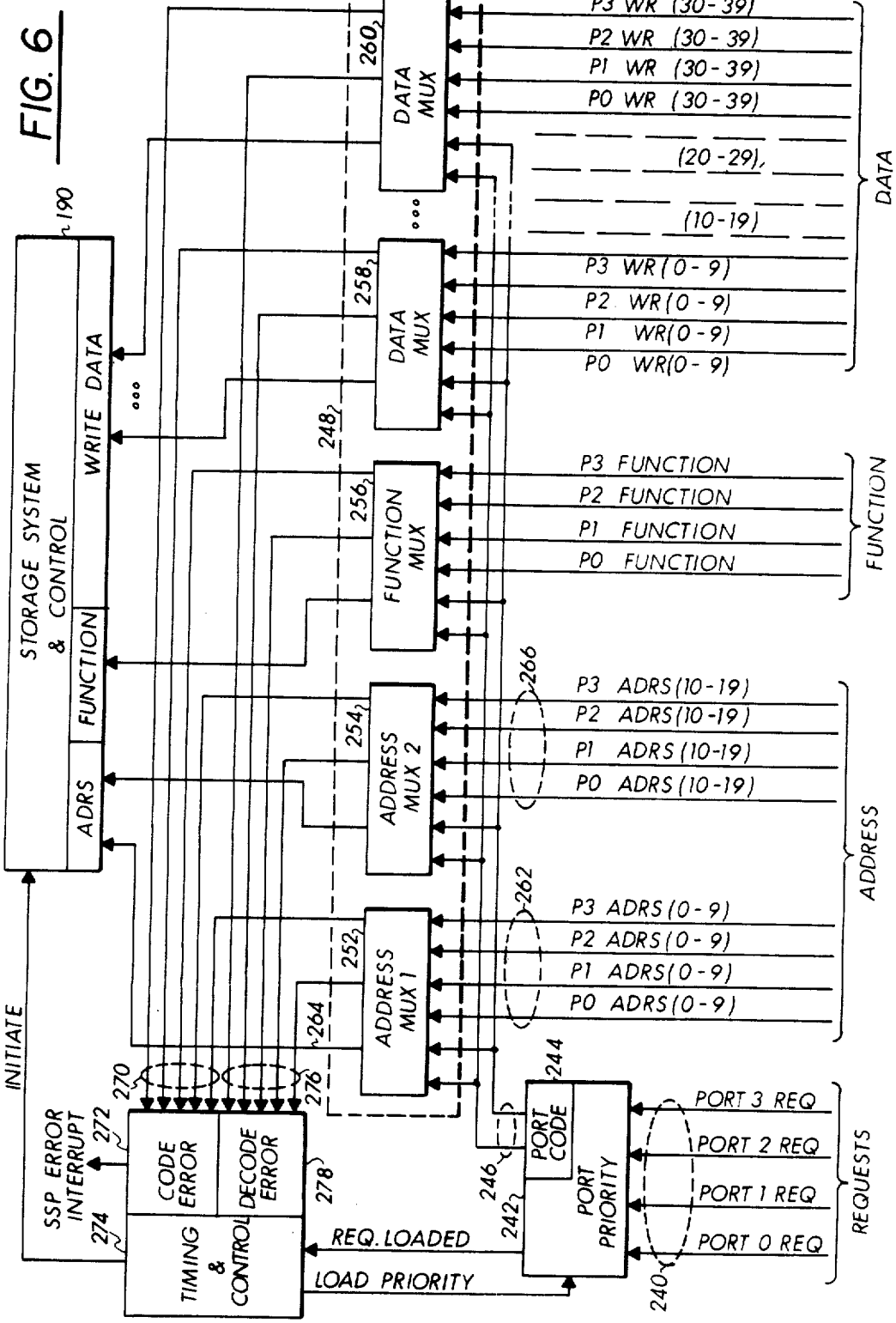
FIG. 6 is a more detailed block diagram illustrating a four port MUX Stack and the port decode error and code error detectors.

FIG. 6 is a more detailed block diagram illustrating a four port MUX Stack and the port decode error and code error detectors. This block diagram is not related specifically to the IOP or the IP, but instead illustrates the relationship of any four port arrangement. In this regard, the Ports are identified as P0 through P3, it being understood that a similar arrangement could be utilized for the IOP MUX Stack or the IP MUX Stack or for the Level 2 selection accomplished in the Bank Priority and Selector (MUX) 60 referenced in FIG. 2.

The Requests are applied on lines 240 to the Port Priority circuitry 242. Again, this Priority circuitry can be of the snap-shot variety that functions to respond to Requests, and to make selection in a prioritized manner between the latched request for a given response cycle. The Port Code circuit 244 provides a 2-bit code on lines 246 that is indicative of the one-of-four Port Request lines selected. A four port MUX Stack is shown enclosed in dashed block 248 and is comprised of Address MUX 1 252, Address MUX 2 254, Function MUX 256, a first Data MUX 258 and a second illustrated Data MUX 260, it being understood that sufficient Data MUX circuits would be similarly provided to accommodate the total number of data bits required. Each of the illustrated MUX circuits essentially handles a selection of up to 10-bits applied on each of the four identified ports. For example, Address MUX 1 252 receives bits 0 through 9 of the Address for each of the Ports P0 through P3 on lines 262, and depending upon the Port Code provided on lines 246, it will be determined which of the four sets of address bits will be selected to be output on line 264 to the Storage System and Control 190. The other ten bits of the Address are selected between the four sets of Address bits 10 through 19 applied on lines 266 to Address MUX 2 254.

Each of the MUX circuits 252, 254, 256, 258, and 260 check the applied Port Code to determine if a Code Error has occurred, and if so, appropriate Code Error signals are provided on lines 270 to the Code Error portion of Timing Control 274, resulting in an Error Interrupt to SSP. Similarly, if the MUX circuits detect the occurrence of a Decode Error, Decode Error signals will be provided on lines 276 to the Decode Error circuitry 278 which also result in Error Interrupt signals being provided to the SSP.

G. Port Decode and Code Error Sequence

Figure 7:
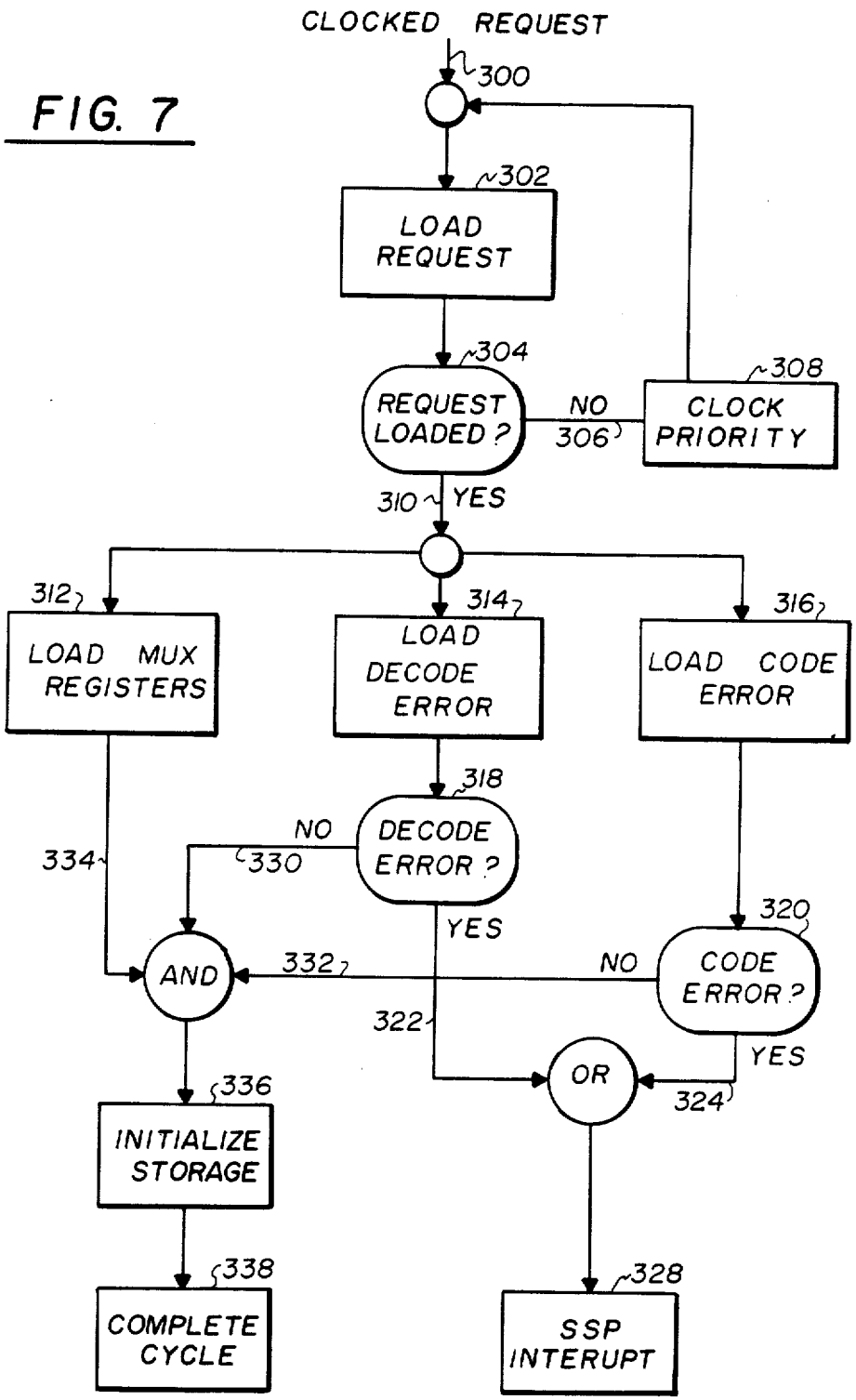
FIG. 7 is a sequence diagram illustrating the port decode error checking and code error checking utilized in a multiple port High Performance Storage Unit.

FIG. 7 is a sequence diagram illustrating the port decode error checking and code error checking utilized in a multiple port High Performance Storage Unit.

At the input, it is assumed that a Priority circuit has latched existing Requests for the multiple port system. As is known, the Priority circuits selects Requests in a predetermined priority order, and for this discussion it will be assumed that the Priority circuitry is clocked through the various available ports. Applying the system to a so-called snap-shot priority circuit, those Requests that are present when the priority circuitry is activated, as indicated by Clock Request on line 300, will result in the selected Request being applied to the Priority circuit, as indicated by Load Request 302. A determination must be made as to whether or not any Request is present as indicated by decision element 304. If no Request is present, the No path 306 will be taken, and the priority circuit will be clocked, as indicated by Clock Priority 308 and the testing of availability of a Request will continue. If a Request has been loaded, the Yes path 310 will be taken, and three actions will occur substantially simultaneously. The Request will be decoded and will be utilized to Load MUX Registers, as indicated by element 312, thereby selecting which of the indicated ports will be utilized. At the same time, the decoded Port Code will be evaluated for an error condition, and if found in error will result in the Load Decode Error 314 condition being set. Further, the Port Code will be evaluated for a Code Error condition, and the Load Code Error 316 function will occur.

Before the storage is initialized, it must be determined whether or not a Decode Error has occurred, as indicated by decision element 318 and whether or not a Code Error has occurred, as indicated by decision element 320. A detected Decode Error will result in the Yes line 322 being taken. If it is determined that a Code Error has occurred, the Yes path 324 will be taken. Either error (as indicated by OR 326) will result in an SSP Interrupt 328. If no Decode Error has occurred, as indicated by the No path 330, and no Code Error has occurred, as indicated by the No path 332, and the MUX Registers have been loaded, as indicated by line 334, the system can Initialize Storage 336, and the storage cycle can be completed as indicated by Complete Cycle 338.

This description of the sequence clearly indicates that through-checking of the Port Code and its decoding can result in errors being detected before the storage system is enabled, and can immediately identify a source of error so that data integrity can be maintained, and any failing HPSU can be identified so that it can be switched out of the system for maintenance or such other remedial steps taken as may be desired in the system.

H. Timing Diagram

Figure 8:
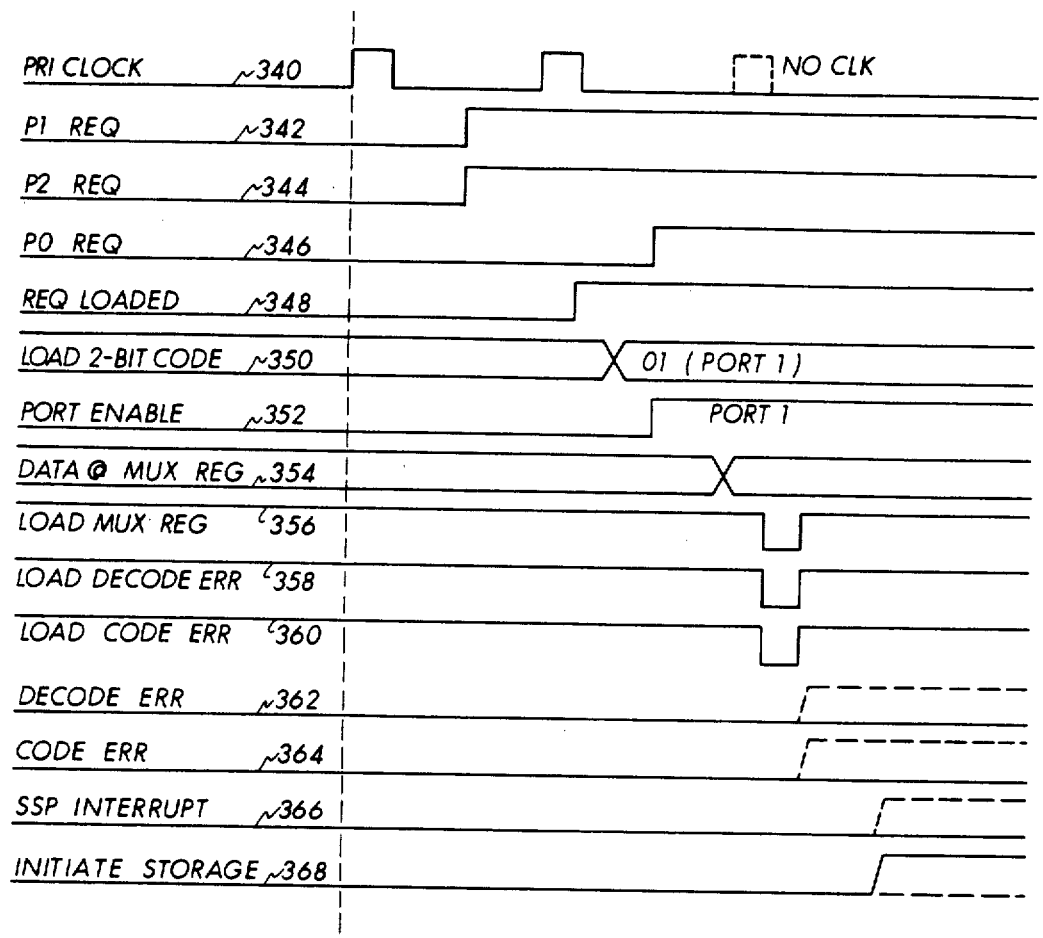
FIG. 8 is a timing diagram that illustrates the sequencess described with reference to FIG. 7.

FIG. 8 is a timing diagram that illustrates the sequences described with reference to FIG. 7.

For purposes of this discussion, assume that the priority system is basically a positional priority, that is, priority is determined by which Requester is hooked to which port. For the discussion, Port P0 will be considered the highest priority with decreasing orders of priority through P1, P2, and P3.

As the Priority is Clocked 340, it is assumed that there is P1 Request 342 and a P2 Request 344. P0 Request 346 does not occur until later, and is not part of the snap-shot Request evaluation. It can be seen then that the P1 Request 342 is the highest priority Request pre- sented.

The Request Loaded 248 signal causes the generation of a 2-bit code 350 indicative of Port 1, thereby resulting in a Port Enable 352 for Port 1. Once the Port Enable signal is generated, the Data for Port 1 is provided at the MUX register 354.

At this time, the Load MUX register signal 356, the Load Decode Error signal 358, and the Load Code Error signal 360 select the data that will be passed through the MUX, and activate the evaluation of the Decode Error and the Error conditions. The Decode Error signal 362 will only occur when such a Decode Error is detected, and similarly, the Code Error signal 364 will only occur when the Code Error is detected. The SSP Interrupt 366 will occur when either Decode Error 362 or Code Error 364 are present. The Initiate Storage 368 will occur when neither the Decode Error 362 nor the Code Error 364 signals are present.

I. Building Blocks

In a consideration of the detailed logic diagrams of the subject invention, standard building block elements will be utilized. Elements of this type are available commercially, or can be fabricated by integrated circuit processes that are well-known.

FIG. 9a is a logic block diagram symbol for a Latch, that will provide true output Y and complement output X. The combination of Clear C and Enable E signals will depend upon whether the Latch is cleared or enabled for being set. Two data inputs D or B are shown. A High signal on either data line D or B in conjunction with a Low Enable will result in a High output signal being provided at Y and a Low output at X. It is understood that if the Latch is to be responsive to only a single input signal, that the other input signal will not be shown.

FIG. 9b is a Truth Table for the functioning of the Latch illustrated in FIG. 9a.

FIG. 9c is a logic element drawing of the Latch illustrated in FIG. 9a, and illustrates the logical elements and interconnections to accomplish the Latch function.

FIG. 10a is the logic block diagram symbol for the two-input Exclusive-OR (XOR). The XOR responds to input signals A and B for providing output signal C. It functions such that a High input signal on either line A or B will result in a High signal at output C. If both A and B receive Low signals or High signals, the output at C will be Low, thus it can be used as a single bit comparator.

FIG. 10b is the Truth Table for the Exclusive-OR illustrated in FIG. 10a.

FIG. 11a is a logic element drawing of a four-input Exclusive-OR (XOR). Input signals F, G, H, and J are applied to their respectively associated OR elements, each of which provide the true and complement of the respectively associated input signals. AND element A1 through A8 are interconnected to the OR input circuits in combinations such that each of the AND circuits A1 through A8 will only be satisfied when the complement of one of the input signals and the true value of the other three input signals are identical. For example A8 responds to $\overline{F}$, G, H, J, and so forth. The output OR circuit is coupled to each of the AND circuits A1 through A8, and will provide a Low signal at X only when all input signals are High. It will be understood, then, since the groupings are by the complement of one input signals with the true value of the other input signals, in the various combinations, that the circuit identifies a Low at X only when one and only one of the input signals F, G, H, or J is different from the other three input signals.

FIG. 11b is a Truth Table illustrating the signal relationships of the Exclusive-OR circuit FIG. 11a.

FIG. 11c is the logic block diagram symbol for the four input Exclusive-OR (XOR) circuit of FIG. 11a.

J. Detailed Logic

Figure 12:
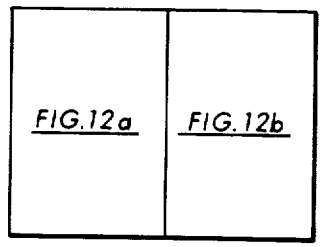
FIG. 12a and FIG. 12b, when arranged as shown in FIG. 12, is a logic circuit diagram of the port decode error detector and code error detector with an associated multiplexer (MUX)
Figure 12A:
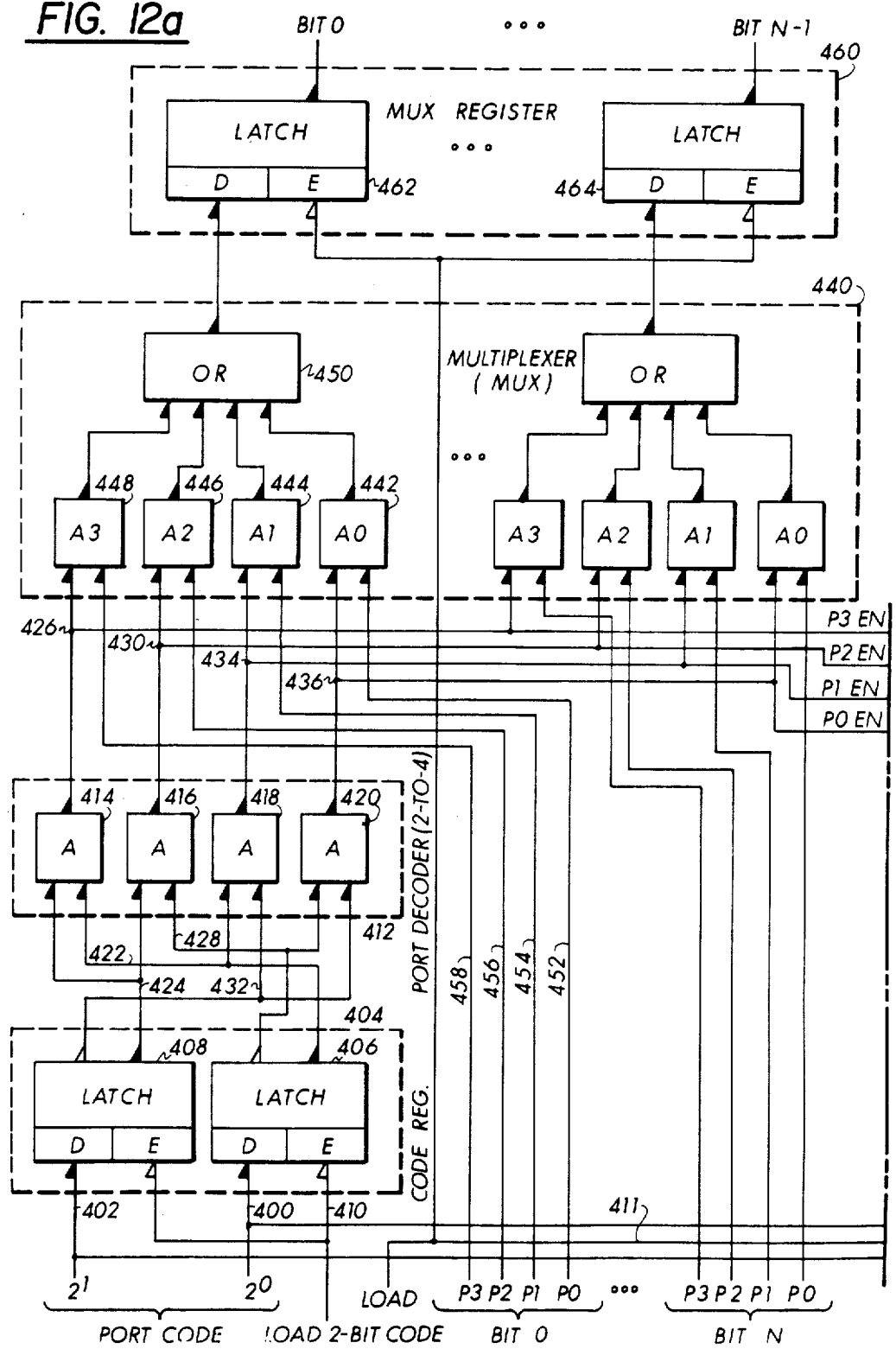
Figure 12B:
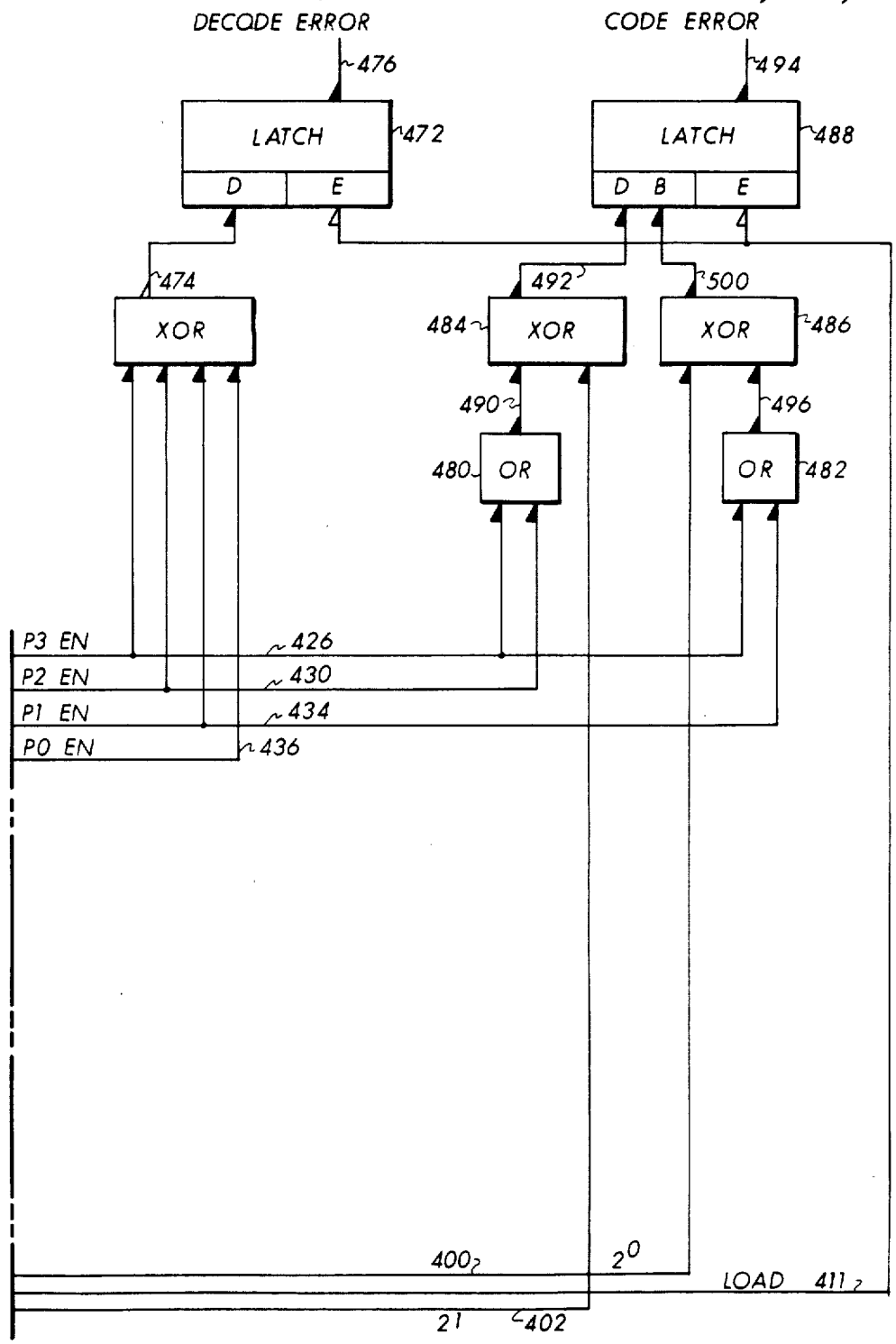

FIG. 12a and FIG. 12b when arranged as shown in FIG. 12, is a logic circuit diagram of the port decode error detector and code error detector with an associated multiplexer (MUX). A 2-bit Port Code is made available from the Port Priority circuitry (see FIG. 5 and FIG. 6), with the $2^0$ bit being received on line 400 and the $2^1$ bit being received on line 402. The Port Code applied to a Code Register, shown enclosed in dashed block 404, is comprised of Latch 406 and Latch 408. The load 2 Bit Code signal is received on line 410, and when applied to the Code Register 404 results in the Port Code being set into Latches 406 and 408. In this configuration, a Port Code of 00 indicates Port 0; 01 indicates Port P1; 10 indicates Port P2; and 11 indicates Port P3.

A 2-to-4 Port Decoder is shown enclosed in dashed block 412, and is comprised of AND circuits 414, 416, 418, and 420. AND circuit 414 receives the true output from Latch 406 on line 422, and true signal from Latch 408 on line 424, and when both signals are High, indicates that the Port Code is 11, and that Port 3 should be selected. The 11 combination results in a High signal on line 426 which serves as the P3 Enable.

AND circuit 416 receives the true output on line 424 from Latch 408, and the complement output from Latch 406 on line 428. Thus when Latch 408 stores a High representation, and Latch 406 stores a Low representation, thereby providing a High signal at the complement output terminal to line 428, circuit 416 will be satisfied. This bit configuration signifies that Port 2 is selected by the binary code 10, and results in a High signal at line 430 to provide the P2 Enable signal.

AND circuit 418 receives the true output from Latch 406 on line 422, and the complement output from Latch 408 on line 432. Thus when Latch 406 provides a High signal and Latch 408 provides a High signal from its complement output, it indicates that the Code Register stores the Port Code 01. These High signals result in AND 418 providing a High signal at output line 434 to comprise the P1 Enable.

AND 420 receives the complement output from Latch 406 on line 428, and the complement output from Latch 408 on line 432. Therefore when the Code Register stores the Port Code 00, both complement output lines will go High, thereby satisfying 420, to provide the P0 Enable at output line 436.

From the foregoing, it will be noted that the Port Decoder 412 should provide one, and only one, High signal on lines 426, 430, 434, and 436, depending upon the binary value of the Port Code. All other unselected Enable lines should provide Low signals.

A four-port Multiplexer (MUX) for handling N bits is shown enclosed within dashed block 440. For each bit position, the MUX utilizes four AND circuits A0 through A3, labelled 442, 444, 446, and 448 for the Bit 0 position, and an OR circuit, labelled 450 for the Bit 0 position. First considering the Bit 0 position, it will be seen that the Bit 0 for P0 is applied on line 452 to A0, for P1 on line 454 to A1, for P2 on line 456 to A2, and for P3 on line 458 to A3. The Port Enable signals are coupled such that A0 receives the P0 Enable on line 436, A1 receives the P1 Enable on line 434, A2 receives the P2 Enable on line 430, and A3 receives the P3 Enable on line 426. For the Bit 0 position, then, it will be seen that one and only one of AND circuits 442, 444, 446, or 448 should be enabled and all others disabled. In a similar manner, all stages of the MUX should receive the Port Enable signals and the associated bit position and the applied data, thereby effecting the port selection of data bits to pass through MUX 440.

An N-bit MUX Register is shown enclosed within dashed block 460, and is comprised of a Latch circuit for each bit position, where Latch 462 is utilized to store Bit 0, and Latch 464 is illustrated to store Bit N-1. The selected output signals from the Multiplexer 440 are applied to respectively associated D input terminals of the associated Latches, such that when the Load signal is applied on line 411 to Enable all Latches, the selected N-bit word applied at the selected Port will be stored in the MUX Register 460.

The circuitry to check the proper functioning of the Port Decoder 412 is comprised of XOR 470 and Latch 472. The four Port Enable signals P0 Enable through P3 Enable applied on lines 426, 430, 434, and 436 are all applied to XOR 470. XOR 470 functions to provide a Low output signal at line 474 when one of the input signals is different from all other input signals. (See FIG. 11a and FIG. 11b). Thus, if the Port Decoder 412 is functioning properly to select one and only one Port Enable, XOR 470 will provide a Low signal when the Load signal is applied on 410, thus setting Latch 472 to a state to provide a Low signal at output line 476, thereby indicating that no Decode Error has occurred. In the event any AND circuit 414, 416, 418, or 420 fails, such that two Port Enable signals are provided on line 426, 430, 434, and 436, there will be two similar inputs and two inputs of the opposite state applied to XOR 470. Under this condition XOR 470 will provide a High output signal on line 474. Then when the Load signal is applied on line 410 to Enable Latch 472, a Decode Error signal will be provided on line 476.

In the configuration shown, the Port Decode circuitry 412 and the Decode Error detection circuitry are shown in conjunction with a single MUX, and provide Decode Error indication for the associated MUX. Provided sufficient circuit drive capacity could be provided by the Port Decoder 412, it could be utilized to drive a plurality of MUX circuits, and the Decode Error detecting circuitry would not need to be replicated for each individual MUX.

The Code Error detecting circuitry is comprised of OR circuits 480 and 482, XOR circuits 484 and 486, and Latch 488. The function of the Code Error detecting circuitry is to determine whether or not the Code Register 404 Latches are properly functioning. This through-check function is accomplished by utilizing the Port Enable signals to essentially reconstitute the Port Code, and to compare the reconstituted Port Code to the Port Code received on lines 400 and 402.

Either the P3 Enable and the P2 Enable should only be present when the applied Port Code bit $2^1$ is set High. Accordingly, the P2 Enable and the P3 Enable are applied to OR 480, and if either are High will result in a High output on line 490 or XOR 484. XOR 484 also receives the Port Code $2^1$ bit on line 402, and if both applied signals are of the same level, will result in a Low output on line 492 to the D input for Latch 488. This would indicate that one of the comparison features has been satisfied. If, however, there is a failure in Latch 408, such that the Port Enable signals are not properly generated, and it occurs that the P3 Enable and P2 Enable are both Low, when $2^1$ received on line 402 is High, it should signal the Code Error condition. It will do so since XOR 484 will provide a High signal on line 492 when the input signals are of different levels, thereby setting Latch 488 to provide a High output signal at output 494 after having been Enabled by the Load signal.

The comparison of $2^0$ can be accomplished by realizing that it will be High when either P3 Enable or P1 Enable should be properly generated. Accordingly, OR 482 receives the P3 Enable and the P1 Enable and will provide a High output on line 496 when either are High. XOR 486 will provide a Low output on line 500 when $2^0$ compares the input received on line 496. If $2^0$ does not compare to the output from OR 482, a High Signal will be provided on line 500 to the B input of Latch 488 and will signify a Code Error.

It is of course clear that a system can utilize the Decode Error checking circuitry independently of and without the necessity of having the Code Error checking circuitry, or vis versa.

Figure 13:
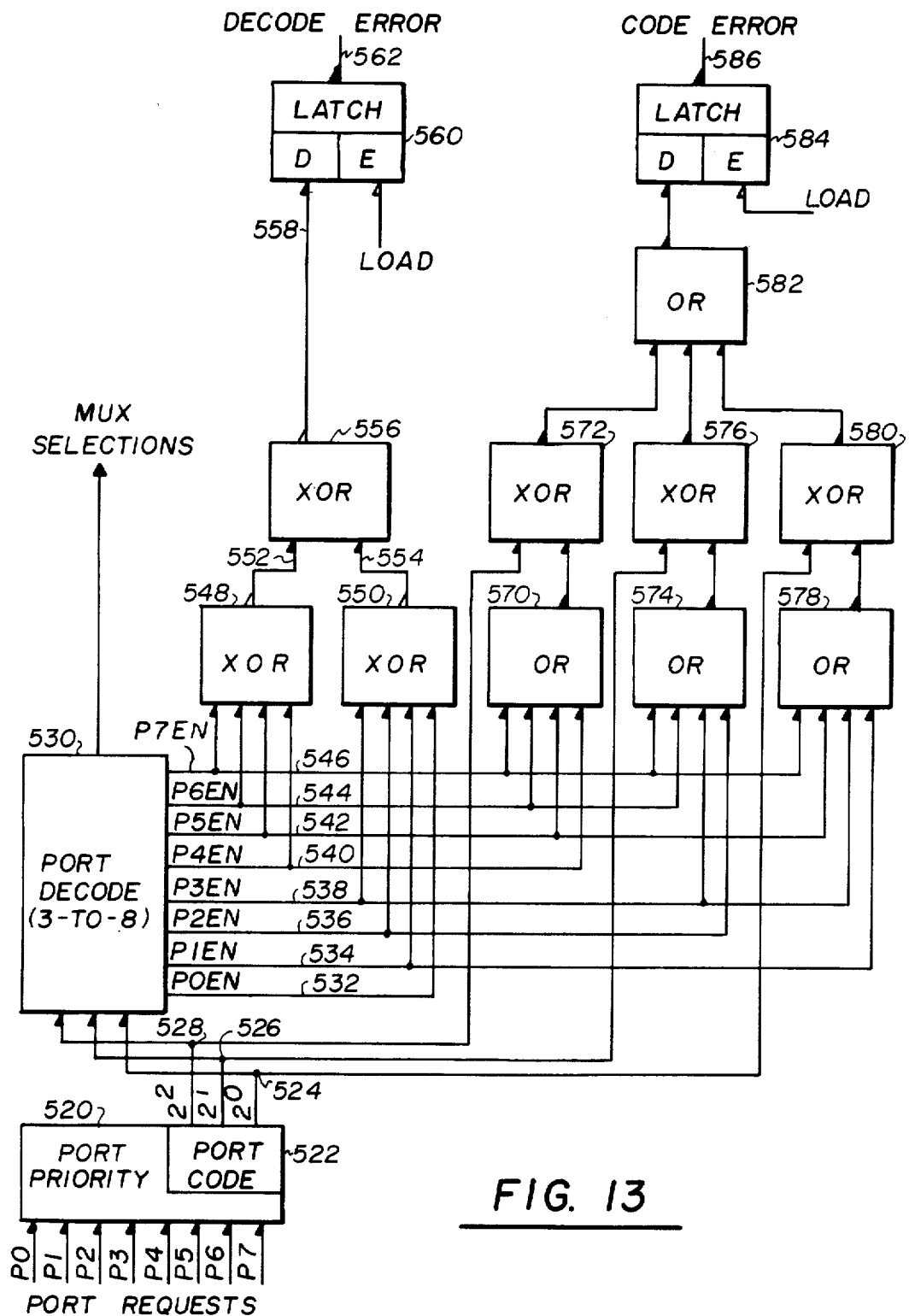
FIG. 13 is a logic block diagram of an alternative embodiment of the decode error detecting circuitry and the code error circuitry for use in an 8-port system.

FIG. 13 is a logic block diagram of an alternative embodiment of the decode error detecting circuitry and the code error circuitry for use in an 8-port system. In the configuration shown, the Port Requests P0 through P7 are applied to the Port Priority circuit 520 which selects a Requester and generates three bits $2^0$, $2^1$, and $2^3$ as a Port Code through its Port Code generating circuitry 522. The Port Code bits are applied on lines 524, 526, and 528 to the Port Decode (3-To-8)530. The Port Decode converts the 3-bit Port Code into one of eight Port Enables, on lines 532 for P0 Enable, with increasing Port identifying numbers for lines 534, 536, 538, 540, 542, 544, and continuing to line 546 for P7 Enable.

As in the 2-bit Port Code embodiment, for the system to function correctly, one and only one, of the Port Enables should be activated for any port selection. To evaluate the possibility of existence of Decode Error, XOR 548 evaluates Port Enables P4 through P7 and XOR 550 evaluates Port Enables P0 through P3. If one and only one of the Port Enables apply to XOR 548 is present, a Low signal will issue on line 552. If the system is working properly, XOR 550 would produce a High signal on line 554 under these circumstances. Accordingly, XOR 556 will provide a Low signal on line 558 to Latch 560, resulting in a Low or No error signal on output 562.

If an error in decoding occurs, and two Enable signals are applied to XOR 548, it will provide a High signal on line 552. If no Enables are applied to XOR 550, it to will provide a High signal to XOR 556. Two High signals at the input of XOR 556 will result in a High output signal at line 558 and will cause Latch 560 to provide a High Decode Error signal at output 562. Other combinations of two or more Port Enable signals will similarly cause Decode Error signals.

The circuitry to check for Code Errors utilizes OR 570 and XOR 572 to analyze bit position $2^2$. It utilizes OR 574 and XOR 576 to analyze bit position $2^1$. Finally, it uses OR 578 and OR 580 to analyze bit position $2^0$. In a manner similar to that previously described, this circuitry responds to the combinations of Port Enables and the applied Port Code for this evaluation. If the comparison in any of the bit positions fail, OR 582 will provide a High signal to Latch 584 resulting in the Code Error signal at output 586.

From the embodiments described, decode error detecting circuitry and code error detecting circuitry for other multiple port arrangements would be apparent to those skilled in the art.

In view of the foregoing, it can be seen that the various stated objectives and purposes of the invention have been achieved. It is of course understood that various changes in logical circuit arrangement, circuit selection, and functionality will become apparent to those skilled in the art after having considered the teaching of applicant without departing from the spirit and scope of the invention. Accordingly, what is intended to be protected by Letters Patent is set forth in the claims.

I claim:

1. For use in a multiple port memory system having addressable banks of storage modules, port selection through apparatus comprising:

multiple port request receiving means for receiving requests for access to the memory system;

priority means responsively coupled to said multiple port request receiving means for providing port code signals indicative of the request to be honored;

a plurality of port means coupled to a corresponding plurality of requestors;

multiplexor means commonly coupled to both said plurality of port means and said priority means, and said multiplexor means responsive to said port code signals and including means for generating decoded port code signals, each of said decoded port code signals providing information for selecting an associated one of said plurality of port means; and port code checking means coupled to said multiplexor means and responsive to said decoded port code signals for providing decode error signals when said decoded port code signals indicate the simultaneous selection of more than one of said plurality of port means.

2. Port selection through-checking apparatus as in claim 1 wherein said multiplexer means includes:

port code register means coupled to said priority means for at least temporarily storing said port code signals; and decoder means coupled to said port code register means for providing a plurality of unique port enable signal combinations, one combination for each of said port code signals for selecting an associated one of said plurality of port means.

3. Port selection through-checking apparatus as in claim 2 wherein said port code checking means includes: port code enable comparison means coupled to said decoder means for providing an enabling signal when one and only one of said port enable signals are received, and for providing a disabling signal when more than one of said port enable signals are received; and output means coupled to said port code enable comparison means for providing decode error signals in response to said disabling signal.

4. Port selection through-checking apparatus as in claim 3 wherein said port code enable comparison means includes an Exclusive-OR circuit means having a plurality of input terminals coupled to said decoder means, with each of said plurality of input terminals coupled to receive an associated one of said unique port enable signals; and circuit means coupled to said Exclusive-OR circuit means for providing said enabling signal when any one of said port enable signals is different from all others of said port enable signals, and for providing said disabling signals when no single one of said port ensable signals is different from the others of said port enable signals.

5. Port selection through-checking apparatus as in claim 4 wherein said port code enable comparison means further includes:

decode error latch means responsively coupled to said circuit means for at least temporarily storing said first and second signals, said decode error latch means having output terminal means for coupling to said output means.

6. Port selection through-checking apparatus as in claim 2 and further including:

code error checking means responsively coupled to said priority means and to said multiplexer means for generating code error signals when said decoded port code signals do not exhibit a predetermined relationship to said port code signals.

7. Port selection through-checking apparatus as in claim 6 wherein said code error checking means includes:

a plurality of first circuit means, each of said first circuit means responsively coupled to said decoder means for receiving predetermined ones of said port enable signals for providing port enable active signals indicative of the presence of any of said predetermined ones of said port enable signals;

a plurality of port code comparison circuit means, each of said port code comparison circuit means coupled to an associated one of said plurality of first circuit means and responsively coupled to said priority means for receiving one of said port code signals for providing code error signals when said one of said port code signals has a predetermined mismatch relation to its associated one of said port enable active signals; and code error output means coupled to said plurality of port code comparison circuit means for transmitting said code error signals.

8. For use in a multiple access port memory system having addressable banks of storage modules and and plurality of requesters coupled to the multiple access ports for accessing the addressable banks of storage modules, a port selection through-checking apparatus comprising:

a plurality of request receiving circuits coupled to said multiple access ports for receiving access request signals therethrough from said plurality of requestors;

a plurality of priority circuits correspoondingly coupled to said plurality of request receiving circuits for prioritizing the received access request signals and for providing port code signals indicative of the port to be selected in response to the received port access requests;

port code receiving means coupled to said plurality of priority circuits for receiving the port code signals therefrom;

decode means coupled to said port code receiving means for decoding said port code signals and including means for providing to said plurality of access ports, one port enable signal indicative of the selected one of the plurality of access ports and also means for disabling all other non-selected access ports of said plurality of access ports; and port decode checking means coupled to said decode means for providing decode error signals when more than said one port enable signal is present.

9. Port selection through-checking apparatus as in claim 8 wherein said port checking means includes:
  port code enable comparison means coupled to said decoder means for providing a first signal when one and only one of said port enable signals are present, and for providing a second signal when more than one said port enable signals are present; and
  output means coupled to said port code enable comparison means for providing decode error signals in response to said second signals.

10. Port selection through-checking apparatus as in claim 9 wherein said port code enable comparison means includes:
  Exclusive-OR circuit means having a plurality of input terminals coupled to said decoder means, with each of said plurality of input terminals connected to receive an associated one of said unique port enable signals.

11. Port selection through-checking apparatus as in claim 10 wherein said port code enable comparison means further includes:
  decode error latch means responsively coupled to said circuit means for at least temporarily storing said first and second signals, said decode error latch means having output terminal means for coupling to said output means.

12. Port selection through-checking apparatus as in claim 8 and further including:
  code error checking means responsively coupled to said priority means and to said multiplexer means for generating code error signals when said decoded port code signals do not exhibit a predetermined relationship to said port code signals.

13. Port selection through-checking apparatus as in claim 12 wherein said code error checking means includes:
  a plurality of first circuit means, each of said first circuit means responsively coupled to said decoder means for receiving predetermined ones of said port enable signals for providing port enable active signals indicative of the presence of any of said predetermined ones of said port enable signals;
  a plurality of port code comparison circuit means, each of said port code comparison circuit means coupled to an associated one of said plurality of first circuit means and responsively coupled to said port code receiving means for receiving one of said port code signals for providing code error signals when said one of said port code signals has a predetermined mismatch relation to said port enable active signals; and
  code error output means coupled to said plurality of port code comparison circuit means for transmitting said code error signals.

14. Port selection through-checking apparatus as in claim 8 wherein said decode means includes:
  port code register means for storing said port code signals, where said port code signals define a binary number; and
  decoder circuit means coupled to said port code register means and having $2^y$ output terminals, where 'y' is a positive integer greater than zero, for decoding said port code signals to provide said one port enable signal on the selected one of said $2^y$ output terminals, and for disabling all others of said $2^y$ output terminals.

* * * * *